Patented Feb. 6, 1951

2,541,004

UNITED STATES PATENT OFFICE 2,541,004

ETHERS OF ISOPROPYLIDENE DI(P-PHENOL) AS PLASTICIZERS FOR THERMOPLASTIC RESINS

Henry Emile Dutot, Stamford, and Margaret Humm Bradley, Bridgeport, Conn., assignors to American Cyanamid Company, New York, N. Y., a corporation of Maine No Drawing. Application November 2, 1948, Serial No. 58,012

5 Claims. (Cl. 260—33.2)

This invention relates to compounds having wide utility as plasticizers for thermoplastic resins.

It is an object of the present invention to provide thermoplastic resins of improved properties.

It is another object of the present invention to produce plasticized thermoplastic resins.

It is another object of the present invention to produce a thermoplastic resin having a high degree of flexibility.

A further object of the present invention is to provide improved plasticizing agents for polystyrene.

Still a further object of the present invention is the provision of a thermoplastic resinous composition which has been plasticized sufficiently to impart a substantial degree of flexibility thereto.

Another object of the present invention is the production of a plasticized polystyrene.

A further object of the present invention is to provide a plasticized polystyrene particularly suitable for use in the production of electrical units such as radio and television condensers and the like.

The above and other objects are attained by incorporating with a thermoplastic resinous composition, as a plasticizer therefor, a compatible diether of an alkylidene di(p-phenol).

The invention will be described in greater detail in conjunction with the following specific examples in which the proportions are given in parts by weight. It should be understood that the examples are merely illustrative, and it is not intended that the scope of the invention be limited to the details therein set forth.

Example

A 25% by weight solution of polystyrene in toluene is prepared and to separate portions thereof are added, in various proportions, 25% by weight solutions in toluene of the diallyl ether of isopropylidene di(p-phenol), the dimethyl ether of isopropylidene di(p-phenol), and the diethyl ether of isopropylidene di(p-phenol, respectively. Films are prepared by pouring 10 parts of each mixture onto glass, air drying to remove the solvent, and finally oven drying the film at 100°–110° C. for 3 hours. The films are then tested for flexibility at 0° C. and at room temperature (about 24° C.). Results obtained are shown in the following table:

| Plasticizer in Film, Per cent by Weight | Temperature in °C. | Ethers of Isopropylidene di(p-phenol) | | |
|---|---|---|---|---|
| | | Diallyl | Diethyl | Dimethyl |
| 10 | 24 | cl-br | | |
| | 0 | br | | |
| 20 | 24 | cl-sl. flex | | |
| | 0 | br | | |
| 30 | 24 | cl-flex | cl-flex | cl-flex |
| | 0 | br | | |
| 40 | 24 | cl-flex | cl-soft | cl-soft |
| | 0 | flex | | |
| 50 | 24 | cl-tacky | cl-soft | cl-soft |
| | 0 | flex | | | cl—clear. sl. flex.—slightly flexible.
br—brittle. flex.—flexible.

Comparative Example

Films are prepared, in accordance with the procedure of the Example, from 25% solution in toluene of polystyrene and from mixtures with the polystyrene solution of various proportions of 25% solutions in toluene of tricresyl phosphate, anisole (methoxybenzene), phenetole (ethoxybenzene), the dimethyl ester of isopropylidene di(p-phenoxyacetic acid) and the diallyl ester of isopropylidene di(p-phenoxyacetic acid), respectively. The films are hand tested and the results obtained are set forth in the following table:

| Modifying Agent in Film, Per Cent by Weight | Temp. in °C. | Modifying Agent | | | | | |
|---|---|---|---|---|---|---|---|
| | | None | Tricresyl Phosphate | Anisole | Phenetole | Esters of Isopropylidene di(p-phenoxyacetic acid) | |
| | | | | | | Dimethyl | Di-allyl |
| | 24 | cl-br | | | | | |
| 10 | 24 | | cl-br | | | cl-br | |
| | 0 | | br | | | br | |
| 20 | 24 | | cl-br | | | cl-br | cl-br |
| | 0 | | br | | | br | |
| 30 | 24 | | cl-br | cl-br | cl-br | cl-br | hazy-br |
| | 0 | | br | | | br | |
| 40 | 24 | | cl-flex | cl-br | cl-br | hazy-br | hazy-br |
| | 0 | | flex | | | br | |
| 50 | 24 | | cl-tacky | cl-br | cl-br | hazy-br | hazy-br |
| | 0 | | flex | | | br | | cl—clear. br—brittle. flex.—flexible.

Thus it will be apparent from the results set forth in the Example and the Comparative Example that resin films containing ethers of isopropylidene di(p-phenol) are equally as clear and flexible as those containing tricresyl phosphate at 40% concentration, but show a much greater flexibility than those containing the prosphate at 30% concentration. It is therefore an advantage of the present invention that comparable effects using the new plasticizers of the present invention may be obtained at lower plasticizer concentration.

It will also be apparent from the Comparative Example that the plasticizing effect of the diethers contemplated by us is very specific. Other aromatic ethers, i. e., anisole and phenetole, exert no such plasticizing effect and neither do closely related compounds having the alkylidene di(p-phenoxy) group, i. e., the esters of isopropylidene di(p-phenoxyacetic acid).

The present invention is not limited to the use, as plasticizers, of the particular diethers of isopropylidene di(p-phenol) shown in the Example and, in fact, it includes ethers of alkylidene di-(p-phenol)s generally which are compatible with the resin to be plasticized. Thus ethers of methylene di(p-phenol), ethylidene di(p-phenol), propylidene di(p-phenol), isobutylidene di(p-phenol) and the like may be substituted for the ethers of isopropylidene di(p-phenol) of the Example. In general, then, the invention covers ethers including the following grouping

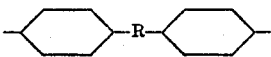

where R is any bivalent saturated aliphatic hydrocarbon group in which the two valences are on a single carbon atom. R may have from one to eight carbon atoms.

Similarly the present invention is not limited to the use of the dimethyl, diethyl and diallyl ethers of the Example. In general, ethers containing the grouping

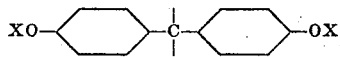

where X is a saturated or an unsaturated aliphatic hydrocarbon group having from one to eight carbon atoms may be used. Both X's need not be the same and mixed ethers may therefore be used in place of the symmetrical diethers of the Example. Included within the scope of our invention are the methyl-ethyl diether, the di(n-propyl) ether, the di(isopropyl) ether, the dicrotyl ether, and the like.

The present invention is not limited to the use of any particular proportion of plasticizers. The resin film should, in general, contain from 20–60% of a plasticizing ether, although we prefer the use of about 30%.

The present invention is not limited to the polystyrene of the Example and included within its scope are all thermoplastic resins such as, for example, cellulose esters, cellulose ethers, polyvinyl resins such as polyvinyl chloride, polyvinyl alcohol, polyvinyl butyral, polyvinyl acetate, polyvinyl formal, polyvinyl acetal, copolymers of vinyl chloride and vinyl acetate, polyvinylidene chloride and copolymers thereof, polymers and copolymers of acrylonitrile and methacrylonitrile, of esters of acrylic acid and methacrylic acid such as methyl acrylate, methyl methacrylate, ethyl acrylate, etc., of acrylamide, and the like.

The ethers of the present invention are preferably added to the thermoplastic resinous compositions at any stage subsequent to polymerization. They may be added in any desired manner such as, for example, by working on hot rolls. The plasticizer may be added, in solution or as an emulsion, to a solution in a suitable solvent or to an emulsion of the polymeric thermoplastic composition. Solvent present may be removed, if desired, by any suitable method such as distillation, spray drying, and the like.

The plasticized thermoplastic resin may be further processed if desired, for example, by grinding to a molding powder or by extrusion to form various shapes.

Dyes, pigments, fillers, other plasticizing agents, natural and synthetic rubber, and other resinous plastic materials may be incorporated with the thermoplastic resinous compositions prior to, during, or after the addition of the ether plasticizing agents in accordance with the present invention.

Polymerization of the styrene, acrylate, or other polymerizable vinyl compound may be carried out in any desired manner such as by application of heat. Catalytic agents may be employed, examples of suitable agents being the inorganic and organic peroxides as hydrogen peroxide, benzoyl peroxide, lauryl peroxide, tert. butyl hydroperoxide, and the like.

Polystyrene or copolymers of styrene with acrylates, plasticized with ethers of the type described in the present invention, have been found to be extremely valuable when applied to fibers and/or fabrics, such as in the production of tough, tear-resistant paper. For such an application, the preferred procedure comprises application of a polystyrene or copolymer emulsion to paper pulp in the beater followed by application of an emulsion of the plasticizing ether since use of an emulsion of plasticized polystyrene or copolymer in one application tends to gum up the pulp. Alternatively, if desired, the emulsions of resin and plasticizer may be applied by saturation technique after formation of the paper.

We claim:

1. A composition of matter including a thermoplastic resin and, as a plasticizing agent therefor, a compatible di(aliphatic hydrocarbon) ether of an alkylidene di(p-phenol) having the general formula

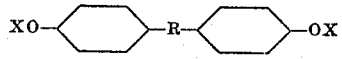

wherein R is a bivalent saturated aliphatic hydrocarbon radical of from 1 to 8 carbon atoms in which the two valences are on a single carbon atom and X is an aliphatic hydrocarbon radical of from 1 to 8 carbon atoms.

2. A composition of matter including polystyrene and, as a plasticizing agent therefor, a compatible di(aliphatic hydrocarbon) ether of an alkylidene di(p-phenol) having the general formula

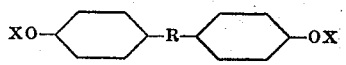

wherein R is a bivalent saturated aliphatic hydrocarbon radical of from 1 to 8 carbon atoms in which the two valences are on a single carbon atom and X is an aliphatic hydrocarbon radical of from 1 to 8 carbon atoms.

3. A composition of matter including polystyrene and, as a plasticizing agent therefor, the diallyl ether of isopropylidene di(p-phenol).

4. A composition of matter including polystyrene and, as a plasticizing agent therefor, the dimethyl ether of isopropylidene di(p-phenol).

5. A composition of matter including polystyrene and, as a plasticizing agent therefor, the diethyl ether of isopropylidene di(p-phenol).

HENRY EMILE DUTOT.
  MARGARET HUMM BRADLEY.

REFERENCES CITED

The following references are of record in the file of this patent:

UNITED STATES PATENTS

| Number | Name | Date |
|---|---|---|
| 2,263,444 | Moyle | Nov. 18, 1941 |
| 2,331,265 | Coleman et al. | Oct. 5, 1943 |